United States Patent [19]
Haslett

[11] Patent Number: 4,890,892
[45] Date of Patent: Jan. 2, 1990

[54] TRACK ROLLER ASSEMBLY
[75] Inventor: Glenn M. Haslett, Peoria, Ill.
[73] Assignee: Caterpillar Inc., Peoria, Ill.
[21] Appl. No.: 253,272
[22] Filed: Oct. 3, 1988
[51] Int. Cl.[4] ............................................. B62D 55/14
[52] U.S. Cl. ........................................ 305/25; 305/28; 305/56; 295/7; 295/11; 295/31.1
[58] Field of Search .................. 305/21, 23, 24, 25, 305/27, 28, 56; 301/5 R; 152/246, 300, 301, 5, 7; 295/7, 11, 31.5

[56] References Cited
U.S. PATENT DOCUMENTS

| | | | |
|---|---|---|---|
| Re. 30,039 | 6/1979 | Clemens et al. | 305/21 |
| 2,033,862 | 3/1936 | Piron | 295/11 |
| 3,147,048 | 9/1964 | Johnson | 308/18 |
| 3,603,650 | 9/1971 | Miller | 305/25 |
| 3,606,497 | 9/1971 | Gilles | 305/56 |
| 3,700,288 | 10/1972 | Davin | 305/38 |
| 3,764,184 | 10/1973 | Orr et al. | 305/25 |
| 3,797,895 | 3/1974 | Tomizawa | 305/27 |
| 3,871,719 | 3/1975 | Boggs | 305/28 |
| 3,910,128 | 10/1975 | Boggs et al. | 74/230.01 |
| 3,996,810 | 12/1976 | Groff | 74/230.3 |
| 4,034,618 | 7/1977 | Groff et al. | 74/243 R |
| 4,035,036 | 7/1977 | Boggs et al. | 305/57 |

FOREIGN PATENT DOCUMENTS 1046366 12/1953 France .................................. 295/7
0887339 12/1981 U.S.S.R. .............................. 305/28

Primary Examiner—Russell D. Stormer
Attorney, Agent, or Firm—Claude F. White

[57] ABSTRACT

A track roller assembly supports and guides a portion of the endless track of a track type vehicle as that portion of the track travels between a drive wheel and an idler wheel of the vehicle. The rim portions of the roller assembly include a plurality of alternating resilient non-metallic rings and metallic rings. The non-metallic rings are compressed between the metallic rings to increase the diameter of the outer walls of the rings. The link rails contact the non-metallic rings only. Conventional track supporting rollers have metallic treads which generate noise and impact against the metal link rails. The rollers often fail to rotate due to insufficient friction with the link rails. The subject roller assembly, with resilient rings in contact with the link rails, generates low levels of noise and vibration and produces sufficient friction to rotate the rollers.

10 Claims, 2 Drawing Sheets

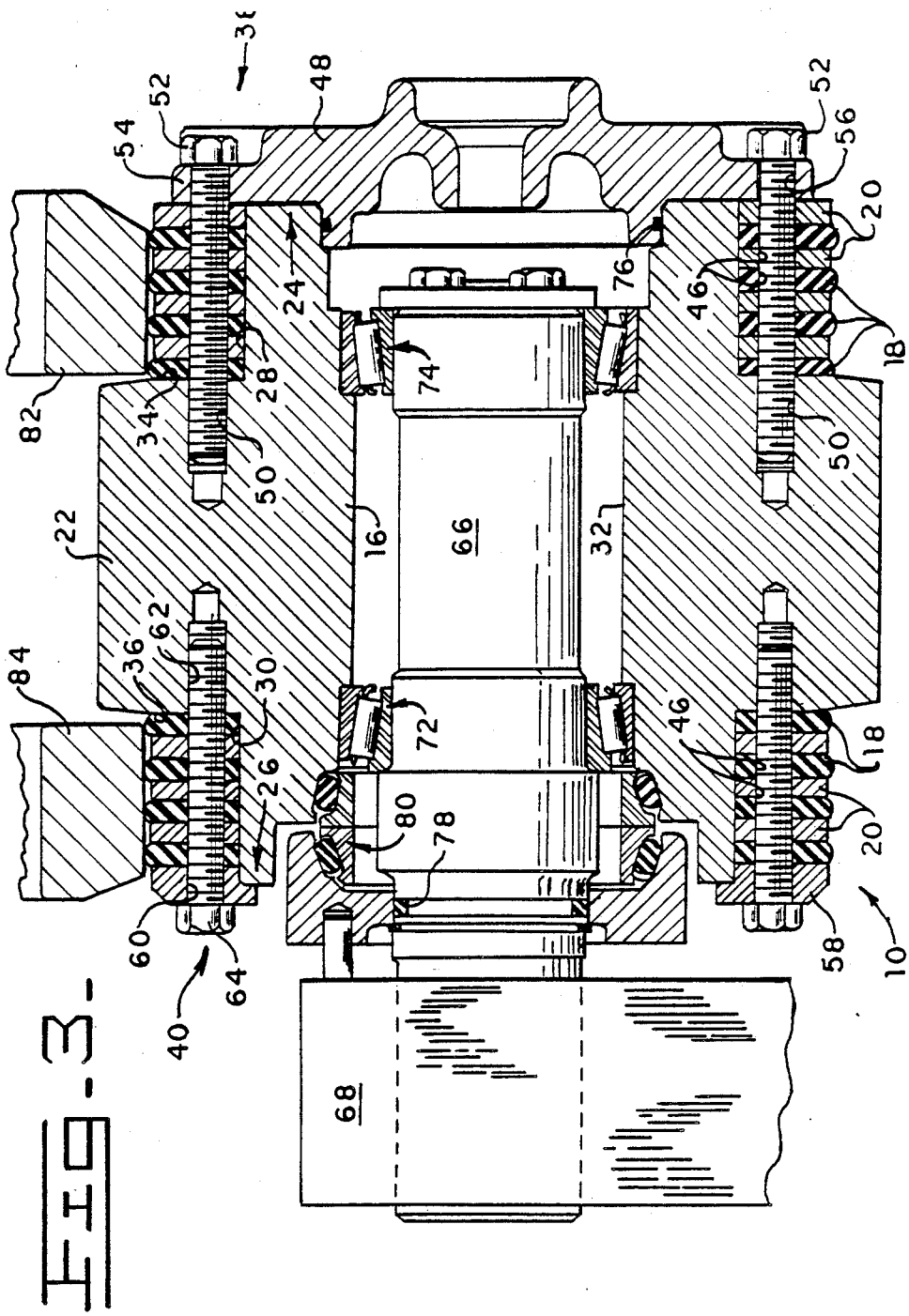

TRACK ROLLER ASSEMBLY

DESCRIPTION

TECHNICAL FIELD

This invention relates generally to track roller assemblies for supporting and guiding the endless track of a track type vehicle and more particularly to a track roller assembly having a resilient tread surface for engaging portions of the endless track.

BACKGROUND ART

Self-laying endless track type vehicles typically utilize an endless track assembly joined together by interconnected link assemblies. The link assemblies include overlapping link members which form a pair of continuous rails which track rollers of the vehicle roll along. The endless loop track is driven by a powered sprocket wheel at one end of the vehicle, and an idler wheel at the opposite end of the vehicle reverses the direction of travel of the endless loop track.

Conventionally, one or more carrier rollers guide and support the upper portion of the track between the idler wheel and the sprocket wheel. The carrier rollers generally rotate as the link rails pass across the rim portions of the rollers. Rotation of the carrier rollers is dependent on friction generated between the rail surfaces and the roller rim surfaces. Considerable noise is produced from the engagement of the roller rims with the rails and wear is a natural result of continuous contact between those metal components. If for various reasons the carrier rollers do not rotate properly, the wear rate between the rails and the roller rims is accelerated. Rapid wear of the roller rims necessitates replacement of the roller rims or, in some cases, the entire carrier roller. Continued wear on the rails would ultimately require repair or replacement of the track link members.

One type of track roller having a replaceable tread portion is disclosed in U.S. Pat. No. 3,871,719, issued on Mar. 18, 1975 to R. L. Boggs. The replaceable tread portions of this roller are formed of a metallic strip in the form of a plurality of convolutions. Preferably, the convolutions are defined by a helix with each convolution in the helix being in abutment with the adjacent convolution. The treads are held in place between a pair of flanges and can be replaced by removing one or more of the flanges. Although this type of roller assembly would appear to function satisfactorily, it would be subject to the wear and noise problems outlined above.

Another type of track roller having a resilient mounted tread is disclosed in U.S. Pat. No. 3,910,128, issued on Oct. 7, 1975 to R. L. Boggs et al. The tread portion of this roller includes an inner resilient collar and an outer metallic ring. The tread portions are held between a pair of flanges and the flanges are secured in place by threaded retaining means. The use of the inner resilient collar is intended to extend the useful life of the outer metallic ring. This particular arrangement would appear to function satisfactorily for its intended purpose. However, it would seem to be susceptible to some of the wear and noise problems previously mentioned.

Still another type of track supporting roller having a resilient rim is disclosed in U.S. Pat. No. 3,996,810, issued on Dec. 14, 1976 to E. R. Groff. The rim, or tread portion, of the roller is constructed from a plurality of separate resilient pads. These pads have a generally rectangular shape and include an aperture formed in each pad. The plurality of pads are banded together into an annular configuration by a steel band disposed internally though the apertures. This roller construction is intended to reduce the noise generated between the running engagement of the endless track chain and the roller, and would appear to operate satisfactorily for that purpose. However, the assembly contains a considerable number of parts and requires time and effort to assemble the parts together.

The present invention is directed to overcoming one or more of the problems as set forth above.

DISCLOSURE OF THE INVENTION

In one aspect of the invention, a track roller assembly for guiding and supporting the endless track of a track laying vehicle includes a roller shell having a radially extending flange portion and first and second circular support surfaces, a plurality of non-metallic and metallic rings encircling each of the first and second circular support surfaces, and first and second means for securing the rings to the flange portion.

In another aspect of the invention, a roller assembly for a track laying vehicle includes a body member having first and second end portions, a radially extending hub portion, and first and second rim portions, a plurality of non-metallic resilient discs, a plurality of metallic discs, first and second retainer plates, and a plurality of threaded fasteners. The non-metallic and metallic discs are mounted on the first and second rim portions.

Self-laying endless track vehicles, which are supported and propelled by steel track assemblies, generally utilize one or more track carrier rollers to guide and support the track assemblies between the driven sprocket wheel and the non-driven idler wheel. The carrier rollers have a pair of rim portions which engage the link rails of the track assembly. Bearings in the carrier roller assemblies provide rotation of the roller rims as a result of friction between the rims and the link rails. Because of the harsh environment in which the track vehicle operates, the carrier rollers often become covered with mud and foreign material. This material reduces the rollers' ability to freely rotate, and in some instances, the rollers stop rotating altogether. When this happens, the track links slide across the rollers, creating noise and rapid wear of the links and rollers.

Motion of the track in several places also produces impact loading on the carrier rollers. This impact loading generates considered noise and causes structural damage to the rollers. When the rollers become worn or damaged, the vehicle must be removed from service while the worn parts are replaced or repaired.

The subject roller assembly provides a solution to the above problems by constructing a carrier roller having a resilient non-metal tread portion for engaging the link rails. This reduces the noise, absorbs the impact loading, and generates additional friction between the tread and the link rails to ensure rotation of the rollers. Replacement of the non-metal tread portion also avoids a waste of time and material.

BRIEF DESCRIPTION OF THE DRAWINGS

FIG. 3 is a diagrammatic sectional view, on an enlarged scale, of one of the track roller assemblies of the present invention.

BEST MODE FOR CARRYING OUT THE INVENTION

Figure 1:
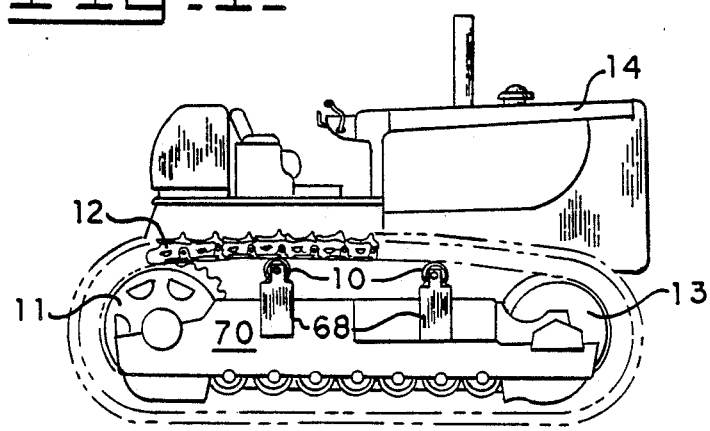
FIG. 1 is a diagrammatic side elevational view of a track type vehicle incorporating the track roller assembly of the present invention.

With reference to the drawings, a track roller assembly 10, which serves to guide and support portions of an endless track 12 between a drive wheel 11 and an idler wheel 13 of a track laying vehicle 14, includes a roller shell or body member 16, a plurality of non-metallic resilient rings or discs 18, and a plurality of metallic rings or discs 20. The roller shell 16 has a radially extending flange or hub portion 22, first and second end portions 24, 26, first and second circular support surfaces or rim portions 28, 30, and a central bore 32 which extends from the first end portion 24 to the second end portion 26. The flange portion 22 has first and second wall surfaces 34, 36 which are adjacent and substantially perpendicular to the first and second rim portions 28, 30 respectively. The first and second rim portions 28, 30 are adjacent the first and second end portions 24, 26 respectively and extend from the first and second end portions 24, 26 to the first and second wall surfaces 34, 36 respectively.

A plurality of the non-metallic and the metallic rings 18, 20 encircle each of the first and second circular support surfaces 28, 30. The rings 28, 30 are so arranged that each of the metallic rings 20 is in frictional surface contact with at least one different non-metallic ring 18. Preferably, the non-metallic and the metallic rings 18, 20 are alternately positioned along the support surfaces 28, 30. The rings 18, 20 are secured to the first and second wall surfaces 34, 36 by first and second securing means 38, 40 respectively.

Figure 2:
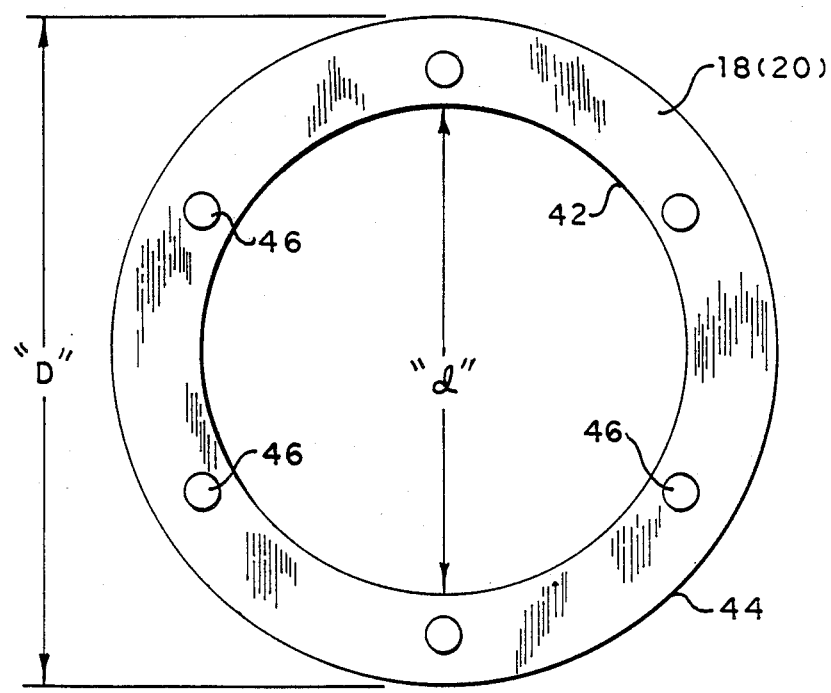
FIG. 2 is a diagrammatic plan view, on an enlarged scale, of one of the non-metallic rings used on the track roller assembly of the present invention.

With particular reference to FIGS. 2 and 3, the non-metallic and the metallic rings 18, 20 are of substantially like size and configuration in their original and unassembled condition. The non-metallic rings 18 are preferably made of rubber and their size and configuration changes somewhat when they are assembled onto the track roller assembly 10. Each of the rings 18, 20 has an internal wall 42 having a diameter "d", an external wall 44 having a larger diameter "D", and a plurality of mounting holes 46. When the rings 18, 20 are mounted on the first and second support surfaces 28, 30, the internal wall 42 of each ring 18, 20 is adjacent one of the support surfaces 28, 30. As the rings 18, 20 are fastened to the wall surfaces 34, 36 by the securing means 38, 40, the non-metallic rings 18 are compressed and are displaced radially outwardly. This compression causes the outside wall diameter of the non-metallic rings 18 to become greater than the outside wall diameter of the metallic rings 20, as shown in FIG. 2.

The first securing means 38 includes a retainer or cover plate 48 adjacent the first end portion 24, a plurality of threaded holes 50 in the first wall surface 34, and a plurality of first thread fasteners 52. The cover plate 48 has a radially extending flange 54 having a plurality of through holes 56, and the fasteners 52 extend through these holes 56, through the mounting holes 46 in a predetermined number of the rings 18, 20, and threadably engage the threaded holes 50 in the wall surface 34.

The second securing means 40 includes a retainer plate 58 having a plurality of through holes 60, a plurality of threaded holes 62 in the second wall surface 36, and a plurality of second threaded fasteners 64. The fasteners 64 extend through the holes 60, through the mounting holes 46 in a predetermined number of the rings 18, 20, and threadably engage the threaded holes 62 in the second wall surface 36. As the first and second fasteners 52, 64 are tightened into the threaded holes 50 and 62, the non-metallic rings 18 positioned on the first and second support surfaces 28 and 30 are compressed by the first and second wall surfaces 34, 36, by the metallic discs 20, and by the first and second retainer plates 48, 58.

As shown in FIG. 3, the cover plate 48 is adapted to close and seal one end of the central bore 32 as the first threaded fasteners 52 secure the cover plate 48 to the first end portion 24. A mounting shaft 66 is adapted to penetrate the other end of the bore 32 and extend substantially the full length of the bore 32. The shaft is supported by a bracket 68 which is secured to a frame portion 70 of the vehicle 14 (FIG. 1). Bearing assemblies 72, 74 provide for relative rotation between the roller shell 16 and the mounting shaft 66. Seals 76 and 78 in the cover plate 48 and the shaft 66 respectively, and a seal assembly 80 seal the bore 16 for lubricating purposes.

As previously mentioned, the track roller assembly 10 supports and guides a portion of the endless track 12 as the track 12 travels between the drive wheel 11 and the idler wheel 13. The link rails 82 and 84 ride on the non-metallic rings 18 and friction between the rails 82, 84 rotate the roller shell, and associated parts, with respect to the mounting shaft 66.

Industrial Applicability

With reference to the drawings, the subject track roller assembly 10 is particularly useful for reducing noise and impact levels between a track supporting roller assembly 10 and the link rails 82, 84 of the moving track 12. The subject roller assembly 10 also generates increased friction between the replaceable non-metallic rings 18 and the link rails 82, 84 to ensure continued rotation of the roller assembly 10.

In the embodiment illustrated, a plurality of resilient non-metallic rings 18 are secured on the support surfaces 28, 30 of the roller assembly 10 by the threaded fasteners 52, 64. A metallic ring 20 is positioned between each of the resilient rings 18, and rings 18 are compressed by the metallic rings, the wall surfaces 34, 36, and the retainer plates 48, 58. As the rings 18 are compressed, the diameter of the external wall 44 increases to a size larger than the external wall 44 of the metallic rings 20. As the link rails 82, 84 move across the roller assembly, they contact only the resilient non-metallic rings 18. When the non-metallic rings 18 become worn or damaged, the rings 18, 20 can be disassembled from the roller shell 16 and one or more of the rings 18 can be easily replaced and the roller 10 re-assembled.

Other aspects, objects and advantages of the present invention can be obtained from a study of the drawings, the disclosure, and the appended claims.

I claim:
1. A track roller assembly for guiding and supporting an endless track of a track laying vehicle, comprising:
   a roller shell having a radially extending flange portion and first and second support surfaces, said flange portion having first and second wall surfaces, said wall surfaces being adjacent and substantially perpendicular to said first and second support surfaces respectively;
   a plurality of non-metallic resilient rings encircling each of said first and second support surfaces;

a plurality of metallic rings encircling each of said first and second support surfaces, each of said metallic rings being in frictional surface contact with at least one different non-metallic ring; and first and second means for securing said non-metallic and said metallic rings to said first and second wall surfaces respectively, said non-metallic rings being compressed and expanded radially outwardly by said first and second securing means.

2. The roller assembly, as set forth in claim 1, wherein said metallic and said non-metallic rings are of substantially like size and configuration in an uncompressed condition.

3. The roller assembly, as set forth in claim 1, wherein said non-metallic rings are made of rubber.

4. The roller assembly, as set forth in claim 1, wherein said metalic and non-metallic rings are alternately positioned along said first and second support surfaces.

5. The roller assembly, as set forth in claim 1, wherein said metallic rings and said non-metallic rings have an external wall and the diameter of the external wall of said non-metallic rings is greater than the diameter of the external wall of said metallic rings when said non-metallic rings are in the compressed condition.

6. The roller assembly, as set forth in claim 1, wherein said second securing means includes a retainer plate having a plurality of holes, a plurality of threaded holes in said second wall surface, and a plurality of second threaded fasteners, said fasteners extending through said retainer plate holes and threadably engaging said threaded holes.

7. The roller assembly, as set forth in claim 1, wherein said roller shell has first and second end portions and a through bore extending from said first end portion to said second end portion, said roller assembly including a cover plate and a mounting shaft, said cover plate being secured to said first end portion and adapted to close and seal one end of said bore, said mounting shaft adapted to penetrate the other end of said bore and extend substantially the full length of said bore.

8. A track roller assembly for guiding and supporting an endless track of a track laying vehicle, comprising:
a roller shell having a radially extending flange portion and first and second support surfaces, said flange portion having first and second wall surfaces, said wall surfaces being adjacent and substantially perpendicular to said first and second support surfaces respectively;
a plurality of non-metallic resilient rings encircling each of said first and second support surfaces;
a plurality of metallic rings encircling each of said first and second support surfaces, each of said metallic rings being in frictional surface contact with at least one different non-metallic ring; and
first and second means for securing said non-metallic and said metallic rings to said first and second surfaces respectively, said first securing means including a cover plate, a plurality of threaded holes in said first wall surface, and a plurality of first threaded fasteners, said cover plate having a radially extending flange having a plurality of holes, said fasteners extending through said holes and engaging said threaded holes in said first wall surface and clamping said flange against said rings.

9. A roller assembly for a track laying vehicle, comprising:
a body member having first and second end portions, a radially extending hub portion, first and second rim portions, and a central bore extending from said first end portion to said second end portion, said hub portion having first and second wall surfaces, said first rim portion being adjacent said first end portion and extending from said first end portion to said first wall surface, and said second rim portion being adjacent said second end portion and extending from said second end portions to said second wall surface;
a plurality of non-metallic resilient discs, each disc having an internal wall and an external wall, said discs being mounted on said first and second rim portions with said internal walls being adjacent said rim portions;
a plurality of metallic discs, each disc having an internal wall and an external wall, said discs being mounted on said first and second rim portion with said internal wall being adjacent said rim portions, said metallic and non-metallic discs being arranged on said first and second rim portions in an alternating array;
first and second retainer plates adjacent said first and second end portions respectively;
a plurality of first threaded fasteners adapted to penetrate said first retainer plate, a predetermined number of metallic and non-metallic discs, and said first wall surface, and
a plurality of second threaded fasteners adapted to penetrate said second retainer plate, a predetermined number of said metallic and non-metallic discs, and said second wall surface, said non-metallic discs being compressed by said first and second wall surfaces, said metallic discs, and said first and second retainer plates as said first and second threaded fasteners penetrate said wall surfaces, the external wall diameter of said non-metallic discs being greater than the external wall diameter of said metallic disc when said non-metallic discs are in the compressed condition.

10. The roller assembly, as set forth in claim 9, wherein said non-metallic discs are made of rubber and are substantially similar in size and configuration to said metallic discs in an uncompressed condition.

* * * * *